March 29, 1932. J. M. DENNEY 1,850,996
AUTOMATIC CLUTCH MECHANISM
Filed April 2, 1930 5 Sheets-Sheet 1

Inventor
J. M. Denney.
By Lacey & Lacey,
Attorneys

March 29, 1932. J. M. DENNEY 1,850,996
AUTOMATIC CLUTCH MECHANISM
Filed April 2, 1930 5 Sheets-Sheet 2

Inventor
J. M. Denney.
By
Lacey & Lacey,
Attorneys

March 29, 1932.  J. M. DENNEY  1,850,996

AUTOMATIC CLUTCH MECHANISM

Filed April 2, 1930  5 Sheets-Sheet 5

Inventor

J. M. Denney.

By Lacey & Lacey, Attorneys

Patented Mar. 29, 1932

1,850,996

UNITED STATES PATENT OFFICE

JOHN M. DENNEY, OF DEPEW, OKLAHOMA

AUTOMATIC CLUTCH MECHANISM

Application filed April 2, 1930. Serial No. 441,135.

The primary object of this invention is to provide a mechanism whereby, when an automobile tends to travel at a speed higher than the speed of the engine, the propeller shaft will be automatically freed so that the vehicle may coast ahead of the engine, free of the compression and transmission gearing, while at the same time it will be under full control of the driver, and gears may be shifted from high to low while the vehicle is traveling at high speed without the rear end of the car back driving over the transmission and against the compression of the engine to impede the gear-shifting operation. Another object of the invention is to provide means whereby, when the engine is started or its speed increased over the speed of the vehicle, the propeller shaft will be automatically coupled to the differential of the vehicle so that the vehicle will be caused to travel forward in the usual manner. Another object of the invention is to utilize the compression of the engine to assist the brakes in retarding or stopping the car, and also to permit the car to be driven in the usual manner, disregarding the present invention. Other objects of the invention will appear incidentally in the course of the following description, and the invention resides in certain novel features which will be particularly pointed out in the appended claims.

Figures 1, 9, 10:
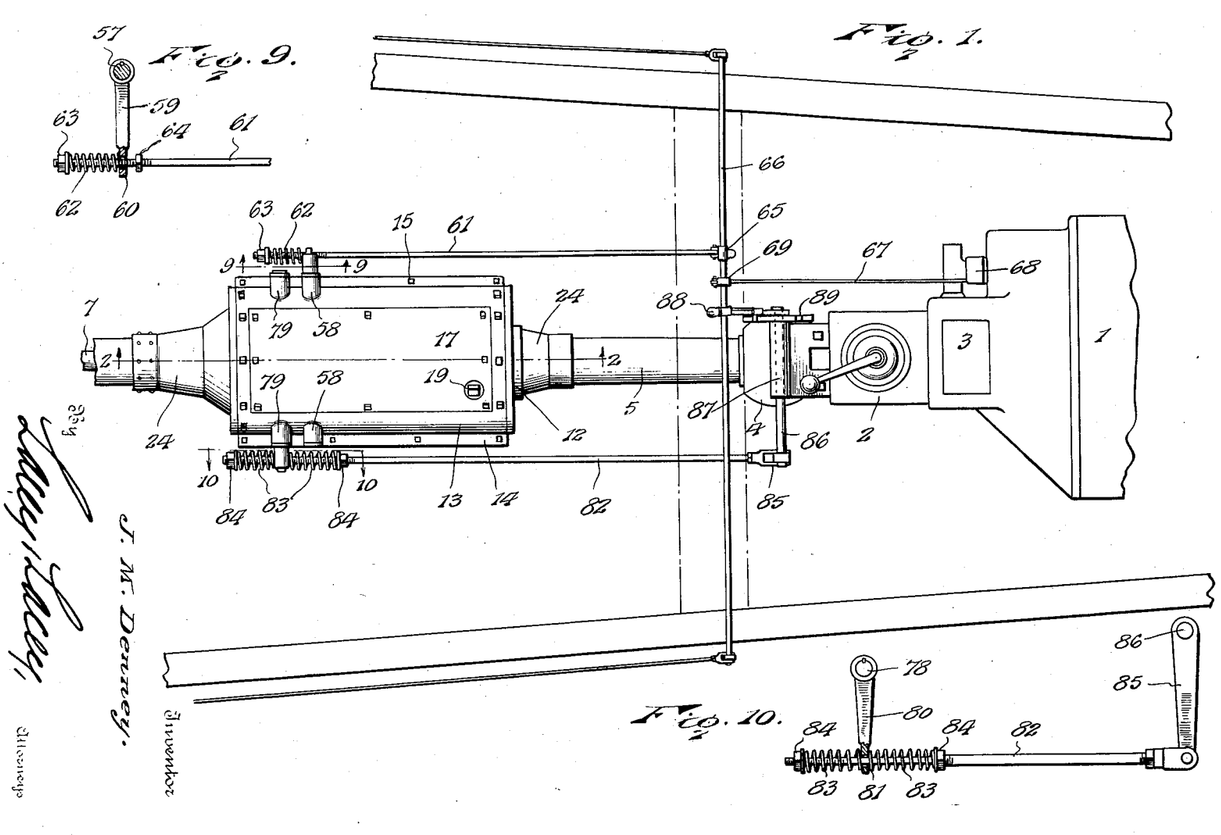
Figure 1 is a plan view of a portion of an automobile chassis showing my invention mounted thereon.
Fig. 9 is an enlarged section on the line 9—9 of Fig. 1.
Fig. 10 is a similar view on the line 10—10 of Fig. 1.

Referring to Fig. 1 of the drawings, the reference numeral 1 indicates the engine of an automobile and 2 indicates the transmission which is connected to the engine through a clutch mechanism of the usual form located at 3, while at 4 is located a universal joint connecting the transmission to the usual propeller shaft, the numeral 5 indicating the usual housing around the propeller shaft. These parts are all part of the regular equipment of standard automobiles and are illustrated in a conventional manner inasmuch as, in themselves, they form no part of my invention.

Figure 2:
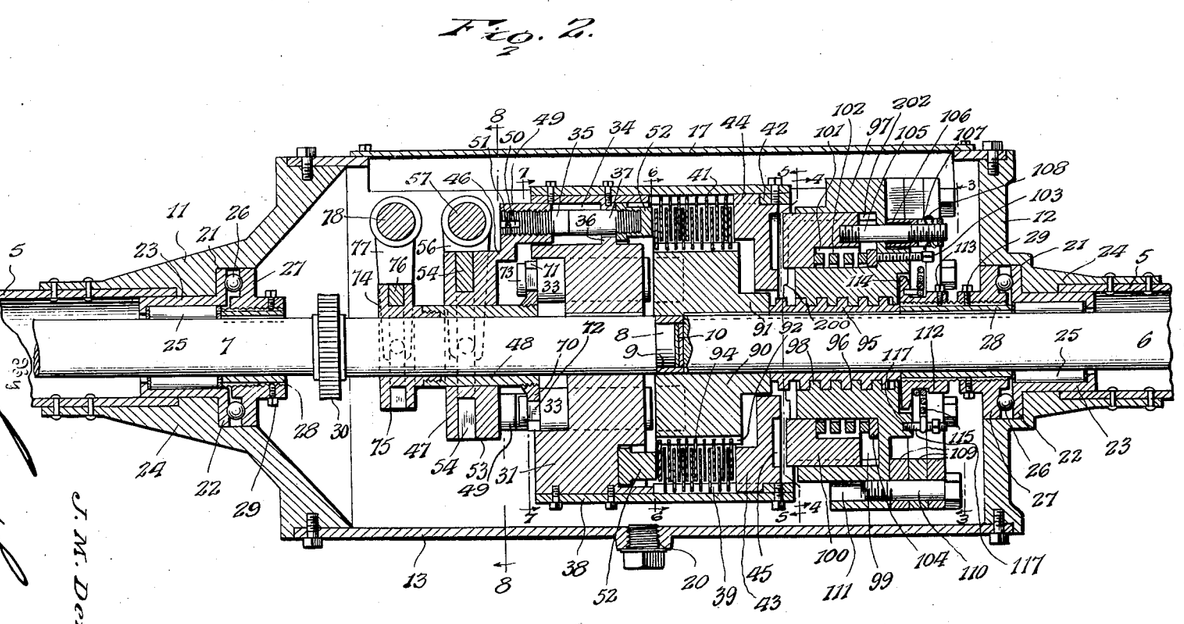
Fig. 2 is an enlarged longitudinal section on the line 2—2 of Fig. 1, Figs. 3, 4, 5, 6, 7 and 8 are transverse sections on the lines 3—3, 4—4, 5—5, 6—6, 7—7 and 8—8, respectively, of Fig. 2.
Figure 3:
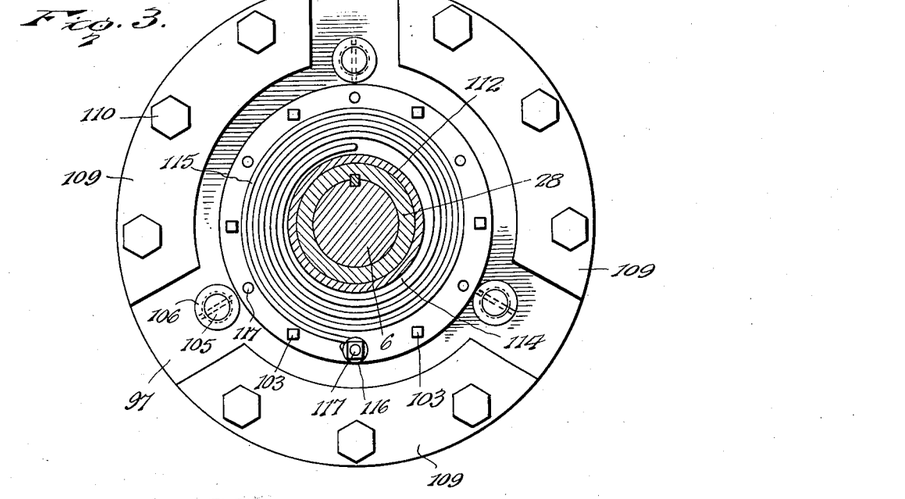
Figure 4:
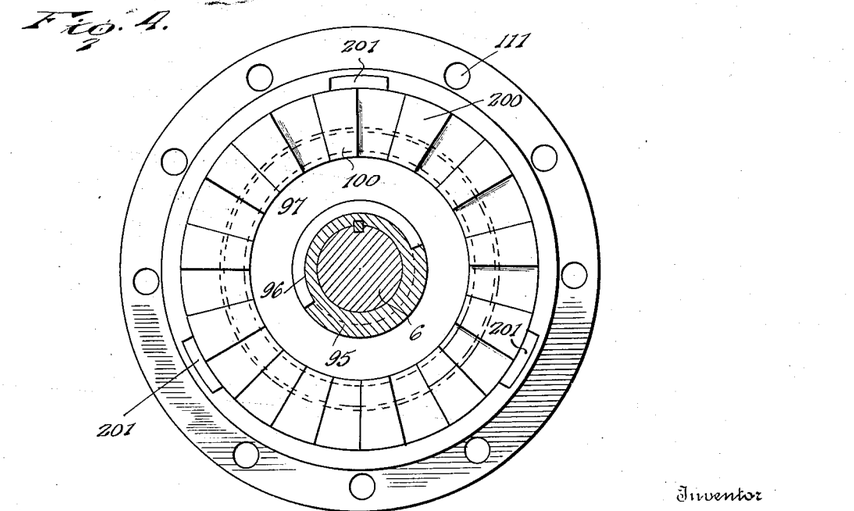
Figure 5:
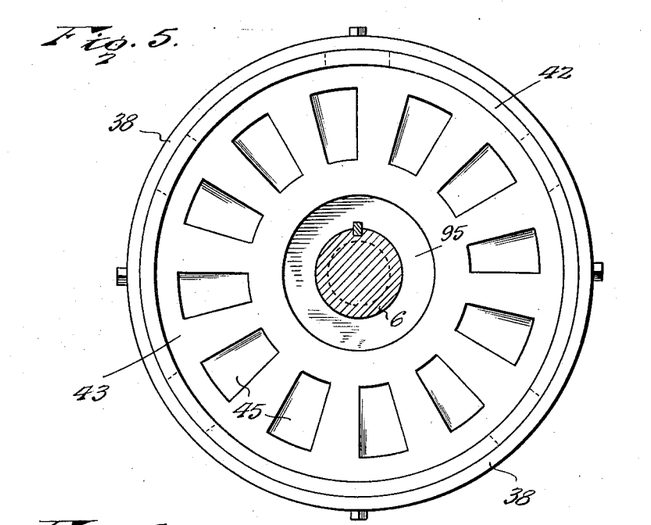
Figure 6:
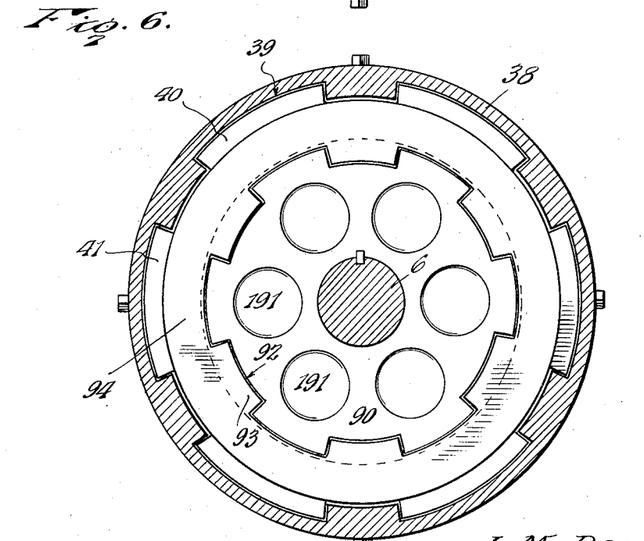
Figure 7:
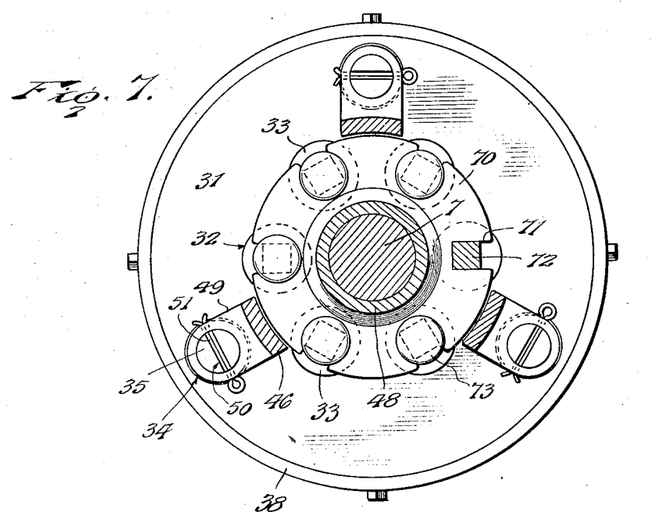

In carrying out the present invention, the propeller shaft is divided at a point between the universal joint 4 and the differential of the vehicle, the differential not being shown in the present drawings. The division of the propeller shaft provides a forward section 6 and a rear section 7 which are axially alined and upon which the elements constituting my invention are mounted. The section 7 has a stud 8 turned on its end and the section 6 carries a member in which is pressed a socket 9 receiving the stud whereby the axial alinement of the two sections will be attained and maintained. Washers 10 may be inserted in the socket 9 to receive the thrust if so desired. It should be understood that in applying the invention to an existing vehicle the propeller shaft therein will be divided and the meeting ends of the sections turned to fit the bearings provided, as described, but in applying the invention to new vehicles the propeller shaft will be originally formed in two sections. Of course, the housing 5 for the propeller shaft will be also cut into two sections, one section of the housing being disposed around one section of the propeller shaft, and, when the mechanism is assembled upon the machine, the ends of the housing sections will be fitted within and riveted or otherwise firmly secured to heads 11 and 12 of a casing 13 which surrounds the joint between the sections of the propeller shaft and all of the mechanism constituting my improved means for coupling the shaft sections. The casing 13 is formed in upper and lower sections provided with mating lugs or flanges 14 through which fastening bolts 15 are inserted, as shown most clearly in Fig. 8, and it is to be noted that the meeting edges of the members of the casing are inclined downwardly and inwardly, as shown at 16, so that when the casing is filled with oil or other lubricant leakage of the oil will be resisted and the use of gaskets will not be imperative, although they may be employed, if preferred. The casing is also preferably provided with a removable cover 17 to facilitate access to the interior when inspection or repair of any of the working parts is desired, and in this cover is a filling opening normally closed by a plug 19 while in the bottom of the casing is a drain plug 20. The heads 11 and 12 of the casing are formed with countersunk recesses, indicated at 21, which receive the radial flanges 22 of sleeves 23 fitting within the tubular extensions 24 of the heads and constituting housings or raceways for roller bearings 25 which fit around the shaft sections, as shown. The flanges 22 constitute race rings for end thrust ball bearings 26, the inner race rings 27 of said bearings being carried by the respective shaft sections, as shown. The inner race rings are threaded onto collars 28 which are keyed to the respective shaft sections and the race rings are held firmly in place by set screws 29 mounted therein and seating in longitudinal grooves in the collars, as shown. A worm pinion 30 is secured upon the rear shaft section and the speedometer drive shaft is driven by this pinion, the speedometer mechanism being omitted from the drawings for the sake of clearness and the location of the pinion being shown merely in order that it may be understood that it is the intention to drive the speedometer from the rear section of the propeller shaft in order that the proper relation between the showing of the speedometer and the speed of the rear axle of the vehicle will be maintained.

Upon the rear shaft section 7, adjacent the front extremity of the same, there is keyed a circular body 31 which has openings 32 formed longitudinally therethrough adjacent its center to receive bolts 33, which will be presently more fully described, and radially beyond the series of openings 32 the body is formed with additional openings 34 extending parallel with the openings 32 and adapted to receive plungers 35. The bores or passages 34 are interrupted adjacent their respective forward ends by webs 36 which form guides and supports for presser pins 37 which play an active part in closing the clutch hereinafter more fully described. Upon the outer circumference of the body or carrier 31 is secured a cylinder 38 which extends forwardly beyond the body 31 and is provided on its inner surface at its forward end with longitudinal grooves 39 in which are slidably received correspondingly shaped lugs or tongues 40 on the outer edges of clutch disks 41, and in the extreme forward end of the cylinder 38 is secured a block ring 42 which closes the front ends of the grooves 39 and constitutes an abutment to retain within the cylinder a gear ring 43. The gear ring 43 is formed on its outer circumference with lugs 44 slidably engaging in the grooves 39 of the cylinder 38 whereby the ring may slide relative to the cylinder but must rotate therewith, and the bore of the gear ring is of sufficient diameter to accommodate the forward shaft section 6 and the parts mounted thereon which will be hereinafter set forth in detail. The forward face of the gear ring is constructed with recesses 45 which are adapted to be engaged by corresponding gear elements mounted upon the forward shaft section to receive rotary movement and to exert pressure upon the clutch disks for closing the clutch. The marginal portion of the rear face of the gear ring serves as a front abutment for the clutch plates or disks.

It will be understood, of course, that the terms "front", "rear", "right", "left", and similar terms used herein are to be interpreted from the viewpoint of a chauffeur operating the vehicle.

Figure 8:
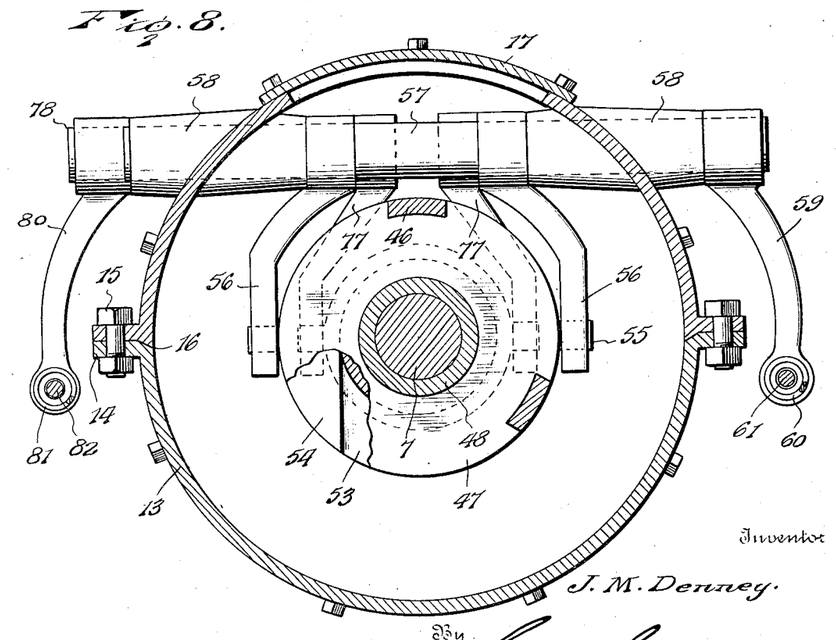

The plungers 35 are mounted in a carrier 46 which includes a collar 47, slidably mounted upon a sleeve 48 which encircles the shaft section 7, and arms projecting radially from said collar or circular body and formed into internally threaded tubes 49 which are disposed longitudinally of the apparatus and adapted to enter the bores or passages 34 in the carrier body 31. The plungers 35 are threaded into the tubular members 49 so as to be adjusted longitudinally to set at the desired point and compensate for wear and in the rear ends of the plungers are slots 50 through which and the tubular portions 49 are inserted cotter pins or similar fasteners 51 to retain the plungers in their set positions. The presser pins 37 are alined axially with the plungers 35, as shown clearly in Fig. 2, and bear against the same and extend slidably through the web 36 in the respective bores 34, the front ends of the pins 37 being threaded into a presser ring 52 arranged to bear upon the rear clutch disks, as will be understood upon reference to Fig. 2, when the clutch is to be closed. The circular body or collar 47 is formed with an annular groove 53 and a fork or yoke 54 is fitted over the collar to seat in said groove, as shown in Figs. 2 and 8. The collar or yoke 54 has diametrically opposite trunnions 55 which are engaged by the forked or notched lower ends of arms 56 firmly secured upon a rock shaft 57 which is journaled in sleeves 58 formed transversely in the upper member of the casing 13. The shaft 57 projects beyond the bearing 58 at the left side of the apparatus and is there equipped with a depending lever or crank arm 59 having an eye 60 at its lower end through which passes the rear end of a connecting rod 61, a buffer spring 62 being disposed around the rod at the rear of said eye and between the same and a nut or adjustable abutment 63, while a second abutment or stop 64 is mounted upon the rod at the front of the eye. The front end of the rod 61 is fitted in the upper end of a lever or crank arm 65 fixed to and rising from the main brake-controlling shaft 66 which is mounted upon the chassis of the vehicle and connected with the several brakes in the usual manner. A connecting rod 67 extends between the usual brake pedal 68 and an upstanding crank 69 on the shaft 66 so that when the brakes are applied the shaft 57 will be rocked and the circular plunger carrier body 47 slid forwardly so that the plungers 35 will drive the pins 37 toward the clutch and the clutch disks will be caused to firmly engage to lock the two shaft sections together.

The sleeve 48, which has been mentioned, is slidably fitted upon the shaft section 7 and upon the front end of the same is threaded a bolt-carrying ring 70 having notches 71 in its periphery to snugly receive the non-circular shanks 72 of the bolts 33, the rear ends of the bolts being provided with heads 73 of sufficient diameter to extend across the notches 71 and thereby prevent separation of the bolts and the bolt carrier, the non-circular formation of the shanks 72 preventing rotation of the bolts in the carrier. The notched carrier 70 is threaded onto the sleeve 48 in order to facilitate the assembling of the parts but, functionally, it might be integral with the sleeve. The rear end of the sleeve 48 has a threaded connection with a collar 74 slidably mounted upon the shaft section 7 and having an annular groove 75 in which is fitted the fork 76 which is provided at diametrically opposite points with trunnions engaged by the forked lower ends of arms 77. Said arms 77 are fixed upon a rock shaft 78 which is journaled in bearing sleeves 79 formed upon the upper section of the casing 13 at the rear of the bearing sleeves 58, as shown. At the right side of the casing the end of the shaft 78 is projected beyond the casing and carries a depending lever or crank arm 80 having an eye 81 at its lower end. A connecting rod 82 has its rear end disposed through the eye 81 and buffer springs 83 are disposed around the rod at the front and at the rear of the eye, as clearly shown in Figs. 1 and 10, adjustable nuts or abutments 84 being mounted upon the rod to adjust the tension of the springs as desired. The forward end of the connecting rod 82 has an adjustable pivotal connection with a crank arm 85 depending from a rock shaft 86 which is mounted in a bearing 87 secured upon the transmission housing and set in such position as may be most convenient, and at the opposite end of said rock shaft is a hand lever 88 equipped with the usual latch cooperating with a holding rack 89 whereby the parts may be held in a set position.

Keyed upon the rear end of the front shaft section 6 is a circular carrier body 90 provided in its rear face with a plurality of sockets 191 corresponding in number and arrangement to the bolts 33 and adapted to be engaged by said bolts so that the shaft sections may be positively locked together. The peripheral portion of the carrier 90 is constructed with longitudinal grooves 92 receiving lugs 93 on the inner peripheries of clutch disks 94, it being noted that the clutch disks 94 and 41 are arranged alternately and there is one more disk 94 than disks 41 so that both end disks will be mounted on the inner carrier or body 90 and the pressure exerted by the abutments 44 and 52 will be both applied to rings 94 and, therefore, a more efficient application of the pressure to close the clutch will be attained. The circular body or carrier 90 has a hub portion 91 which extends into the bore of the gear ring 43 so as to aid in guiding the gear ring in its sliding movements, and the rear face of the gear ring is properly shaped to fit around the carrier 90 and apply pressure to the clutch disks.

Keyed upon the shaft section 6 in advance of the carrier 90, and abutting the front end of the hub 91 thereof, is a sleeve 95 which has coarse threads formed upon its outer circumference, as indicated at 96, and engaged with and encircling said sleeve is a carrier 97 having its bore formed with similar coarse threads 98 whereby it may have longitudinal movement relative to the sleeve when the sleeve is rotated. This carrier 97 has an annular chamber 99 formed longitudinally therein and slidably mounted in said chamber is an annular dog 100, the rear end of which is formed with teeth or lugs 200 adapted to engage the sockets 45 in the gear ring 43 so that the gear ring will be locked to the carrier 97 and caused to rotate with it, and the engagement of the carrier with the threaded sleeve 95 will effect rearward movement of the carrier so that the clutch will be automatically closed. The bore of the dog 100 is enlarged at its front end, as at 101, and an expansion spring 102 is disposed within the annular chamber 99 and accommodated within the enlargement of the bore to consequently exert a rearward pressure upon the dog whereby it will be held in position to engage the recesses 45. The dog is provided upon its outer circumference with longitudinal ribs 201 slidably engaged in longitudinal grooves 202 in the outer wall of the chamber 99 so that the dog will be constrained to rotate with the carrier 97. The tension of the spring 102 is adjusted by set bolts 103 mounted in the forward wall of the carrier 97 and bearing against an abutment ring 104 disposed at the forward wall of the chamber 99. By providing a plurality of the set bolts 103, the abutment ring 104 may be moved evenly so that the tension upon the spring 102 will be even throughout the same. The movement of the dog 100 under the influence of the spring 102 is limited by studs or pins 105 which are threaded into the forward end of the dog and project therefrom through the front wall of the carrier 97, a sleeve nut 106 being threaded on the outer end of each bolt and provided with longitudinal slots 107 to permit a locking key or cotter pin 108 to be inserted diametrically through the outer end of the stud so that the sleeve nut will be held in proper adjustment. The rear end of the nut has a slightly enlarged bore to accommodate the threaded portion of the stud so that a wide range of adjustment may be effected. Secured upon the front end or face of the carrier 97 are lugs or plates 109 which are disposed at intervals about the periphery of the carrier and may be arranged in groups so that any desired weight may be added to the carrier in order to utilize the same as a flywheel and attain a steady even movement of the carrier when it is in action. The lugs are held in place on the carrier by bolts 110 inserted through the lugs and engaged in openings 111 formed through the marginal portion of the carrier, as shown and as will be understood. The spring 102 holds the dog to the gear ring 43 for rotation together when in action and also cushions the engaging impact, preventing a jar upon the general mechanism which might, otherwise, follow a sudden acceleration of the engine.

The front end of the threaded sleeve 95 abuts the rear end of the bearing sleeve 28 and upon the rear end of said sleeve 28 is threaded a stop collar 112, set bolts 113 securing the collar in any position to which it may be adjusted. The collar 112 is provided at its rear end with an annular flange 114 accommodated in a recess provided therefor in the front end of the carrier 97 thereby limiting the forward movement of the carrier, and in advance of said flange is an annular groove to receive the two innermost turns of a volute spring 115 which has its inner extremity fitted in said flange, as shown in Fig. 2, and is provided at its outer end with an eye 116 to be engaged around a set bolt 117 mounted in the carrier 97, as shown. A plurality of these bolts 117 are provided but only one retaining nut may be required, the eye being engaged over whichever one of the bolts will impart the desired tension to the spring. This spring acts in opposition to the normal rotation of the carrier 97 so that the return movement of the parts after an operation will be facilitated.

If the hand lever 88 be moved rearwardly, the bolts 33 will be projected so as to engage the body 90 which is keyed upon the forward shaft section and the two shaft sections will then be positively locked together while, if the hand lever be moved forwardly, the bolts will be retracted and the shafts may then move independently unless coupled through the clutch. Assuming the bolts 33 to be retracted and the clutch to be opened, the shaft sections will be disconnected. If the engine be then started, the rotation of the propeller shaft section 6 will be imparted directly to the threaded sleeve 95 and this sleeve acting upon the inert carrier 97, through its threaded connection therewith, will obviously cause said carrier to move rearwardly, whereupon the dog 100 will press the gear ring 43 rearwardly to close the clutch thereby connecting the shaft sections so that they will act as a single propeller shaft. When the two shaft sections rotate at the same speed, the clutch will have reached the fully closed state and the rearward movement of the dog and the carrier 97 will cease. The movement of the carrier 97 rearwardly will be facilitated by the provision of the counter-weight lugs 109 which cooperate with the inertia of the carrier to cause the required interengagement between the threaded surfaces. If in the travel of the vehicle the differential should tend to run at a speed higher than that of the engine, a relatively reverse movement will be imparted to the carrier 97 so that the clutch will be opened and the vehicle will be thereby relieved of the compression of the engine and may coast ahead free of the transmission gearing. The car remains under normal control, however, since the transmission remains in gear, and, application of the foot brakes effects a closing of the clutch, the compression is restored and cooperates with the brakes in slackening the speed of the car, or stopping it. If the car is to be driven in reverse, the two shaft sections are positively locked together by manipulation of the hand lever 88.

This invention operates automatically to permit the vehicle to coast while the transmission remains in gear. The differential is prevented from back driving through the transmission and against the compression to impede the shifting from higher to lower gear while the vehicle is traveling at a high speed, and when the engine is started or increases its speed to a rate higher than that at which the vehicle is traveling, the differential will be connected to the transmission automatically to cause the vehicle to travel forwardly under the power of the engine. When the brakes are applied, the compression of the engine will be regained and used to aid the brakes. The vehicle will be under complete control of the chauffeur at all times, contributing to the safety and comfort of the passengers, reducing the wear upon the engine and economizing fuel.

Having thus described the invention, I claim:

1. The combination of axially alined shaft sections, carrier members secured upon the respective sections at the meeting ends thereof, the member upon one shaft section having longitudinal passages therethrough and including an extension encircling the carrier member on the other shaft section, slidable clutch plates disposed alternately upon the periphery of the last-mentioned carrier member and the inner circumference of said extension, an abutment slidably mounted in the longitudinal passage of the carrier having said extension and arranged to bear against one end of the series of clutch plates, an abutment slidably mounted in the end of said extension and bearing against the opposite end of the series of clutch plates, and means engaged with the last mentioned abutment and operated by relative rotation of the corresponding shaft section for causing said abutment to bear upon the clutch plates for closing the clutch.

2. The combination of front and rear axially alined shaft sections, carrier members secured upon the respective shaft sections at the meeting ends of the same, the carrier member on the rear section having a cylindrical encircling member extending forwardly around the carrier on the front shaft section, clutch plates slidably mounted alternately on said encircling member and on the carrier on the front shaft section, a presser member mounted in the carrier on the rear shaft section and bearing against the clutch plates, a ring slidably mounted in the front end of said encircling element, and means mounted on the front shaft section and actuated by rotation of the same to engage said ring and force it rearwardly to effect frictional engagement of the clutch plates between the ring and the presser member in the carrier on the rear shaft section.

3. The combination of axially alined shaft sections, carrier bodies secured upon the respective sections at the meeting ends of the same, the carrier on the rear shaft section having longitudinal passages therethrough and provided with diametric webs in said passages intermediate the ends thereof, a cylinder secured about said carrier and projecting forwardly around the carrier on the front shaft section, presser pins mounted in the longitudinal passages of the carrier on the rear shaft section, plungers slidably mounted through the webs in said passages and at their rear ends engaging said presser pins, means for operating said plungers, a presser ring carried by the front ends of the plungers, clutch plates fitted alternately upon the carrier on the front shaft section and in the said cylinder, said presser ring bearing against the rearmost clutch plate, an abutment mounted in the front end of the cylinder against which the clutch plates may be compressed to close the clutch by the action of the plungers and the presser pins, and means mounted on and operated by the front shaft section for driving the last mentioned abutment against the clutch plates.

4. The combination of axially alined shaft sections, carriers secured upon the shaft sections at their meeting ends, clutch plates engaged alternately with the respective carriers, an abutment in the rear carrier for the clutch plates, an abutment ring mounted in advance of the front carrier and adapted to bear against the clutch plates, a threaded sleeve secured upon the front shaft section in advance of the carrier thereon, a ring mounted upon said sleeve and having threaded engagement therewith whereby rotation of the front shaft section may cause rearward movement of the ring, and presser means mounted in said ring and adapted to engage and bear against the abutment ring.

5. The combination of front and rear axially alined shaft sections, carriers secured upon the respective sections at the meeting ends thereof, clutch plates mounted alternately upon the respective carriers, a gear ring carried by the rear carrier and arranged to press against the series of clutch plates at the front end thereof, a threaded sleeve secured upon the front shaft section in advance of the carrier thereon, a ring having threaded engagement with said sleeve whereby rotation of the shaft will impart rearward movement thereto, a dog mounted in said ring and adapted to engage the gear ring, yieldable means for holding the dog rearward, and adjustable means for limiting the relative rearward movement of the dog.

6. The combination of front and rear axially alined shaft sections, carriers secured upon the respective sections at the meeting ends of the same, clutch plates engaged alternately with the respective carriers, an abutment in the rear carrier for the clutch plates, a gear ring mounted in the front end of said carrier to bear against the front end of the series of clutch plates, a threaded sleeve secured upon the front shaft section in advance of the carrier thereon, a ring mounted on said sleeve and having threaded engagement therewith whereby to move rearwardly when the shaft is rotated, a dog mounted in said ring and adapted to engage the gear ring, an expansion spring seated in the ring and acting to project the dog, means for adjusting the tension of the spring, and means for limiting the movement of the dog under the influence of the spring.

7. The combination of front and rear axially alined shaft sections, carriers secured on said sections at the meeting ends of the same, clutch plates engaged alternately with the respective carriers, an abutment in the rear carrier for the series of clutch plates, a gear ring mounted in the front end of the rear carrier to bear against the front end of the series of clutch plates, a threaded sleeve secured on the front shaft section in advance of the carrier thereon, a ring having threaded engagement with said sleeve whereby to move rearwardly as the shaft is rotated, a dog mounted in said ring and adapted to engage the gear ring, means in the ring for yieldably projecting the dog, means for retaining the dog in the ring, and means interposed between said ring and the shaft tending to return the ring to initial position.

8. The combination of front and rear axially alined shaft sections, carriers secured upon the shaft sections at the meeting ends of the same, clutch plates engaged alternately with the respective carriers, a gear ring mounted in the front end of the rear carrier to act on the clutch plates for closing the clutch, a threaded sleeve secured on the front shaft section in advance of the carrier thereon, a ring having threaded engagement with said sleeve whereby to move rearwardly as the shaft is rotated, a dog mounted in said ring to engage the gear ring for closing the clutch, and a volute spring anchored at one end in the ring and at its opposite end to the shaft and acting in opposition to the rotation of the shaft to effect return movement of the ring.

9. The combination of front and rear axially alined shaft sections, carriers secured upon the shaft sections at the meeting ends of the same, clutch plates engaged alternately with the respective carriers, a gear ring mounted in the front end of the rear carrier to act on the clutch plates for closing the clutch, a threaded sleeve secured on the front shaft section in advance of the carrier thereon, a ring having threaded engagement with said sleeve whereby to move rearwardly as the shaft is rotated, a dog mounted in said ring to engage the gear ring for closing the clutch, and a volute spring anchored at one end in the ring and at its opposite end to the shaft and acting in opposition to the rotation of the shaft to effect return movement of the ring, the connection of the spring to the ring being shiftable about the shaft to vary the tension of the spring.

10. The combination of axially alined shaft sections, carriers secured upon the shaft sections at their meeting ends, clutch plates engaged alternately with the respective carriers, an abutment in the rear carrier for the clutch plates, a gear ring mounted in advance of the front carrier and constituting a front abutment for the clutch plates, a threaded sleeve secured upon the front shaft section in advance of the carrier thereon, a threaded ring mounted upon and engaging with said sleeve whereby rotation of the front shaft section may cause rearward movement of the ring, presser means mounted in said threaded ring and adapted to engage and bear against the gear ring, and an adjustable stop at the front of the threaded ring to limit the forward movement of the same.

11. The combination of axially alined shaft sections, carriers secured upon the shaft sections at their meeting ends, clutch plates engaged alternately with the respective carriers, an abutment in the rear carrier for the clutch plates, a gear ring mounted in advance of the front carrier and constituting a front abutment for the clutch plates, a threaded sleeve secured upon the front shaft section in advance of the carrier thereon, a ring threaded upon said sleeve whereby rotation of the front shaft section may cause rearward movement of said ring, presser means mounted in said ring and adapted to engage and bear against the gear ring, and inertia elements mounted on the front end of the ring on the threaded sleeve.

12. In a clutch mechanism, the combination of a shaft, a carrier fixed on the shaft, bolts slidably mounted in the carrier, a mating carrier in advance of the first-mentioned carrier to be engaged by the bolts, clutch elements fitted upon the two carriers radially beyond the bolts, clutch-closing elements slidably mounted in the first-mentioned carrier radially beyond the bolts to act upon the clutch elements, a sleeve slidably mounted on the shaft and engaged with the bolts, a collar slidably mounted on the sleeve and engaged with the clutch-closing elements, and means for selectively operating the sleeve and the collar.

In testimony whereof I affix my signature.

JOHN M. DENNEY. [L. S.]